United States Patent [19]

Sasaki

[11] Patent Number: 4,608,661
[45] Date of Patent: Aug. 26, 1986

[54] PROGRAMMABLE SEQUENCE CONTROLLER

[75] Inventor: Junichi Sasaki, Numazu, Japan

[73] Assignee: Toshiba Kikai Kabushiki Kaisha, Tokyo, Japan

[21] Appl. No.: 798,156

[22] Filed: Nov. 15, 1985

Related U.S. Application Data

[63] Continuation of Ser. No. 440,313, Nov. 9, 1982, abandoned.

[30] Foreign Application Priority Data

Nov. 16, 1981 [JP] Japan ................................ 56-182188

[51] Int. Cl.[4] .......................... G06F 9/00; G06F 11/00; G05B 15/08
[52] U.S. Cl. .................................... 364/900; 364/131; 364/140; 371/14
[58] Field of Search ... 364/200 MS File, 900 MS File, 364/130, 131, 132, 133, 137, 138, 140, 184, 186; 371/14

[56] References Cited

U.S. PATENT DOCUMENTS

| | | | |
|---|---|---|---|
| 4,058,711 | 11/1977 | Ondercin et al. | 364/133 |
| 4,064,394 | 12/1977 | Allen | 364/139 |
| 4,144,550 | 3/1979 | Donohue et al. | 364/107 |
| 4,215,399 | 6/1980 | Pavicic et al. | 364/200 X |
| 4,228,496 | 10/1980 | Katzman et al. | 364/200 |
| 4,254,473 | 3/1981 | Galdun et al. | 364/184 |
| 4,298,928 | 11/1981 | Etoh et al. | 364/200 |
| 4,323,966 | 4/1982 | Whiteside et al. | 364/200 |
| 4,396,973 | 8/1983 | Imazeki et al. | 364/136 |
| 4,425,616 | 1/1984 | Woodell | 364/200 |
| 4,459,655 | 7/1984 | Willemin | 364/132 |
| 4,500,951 | 2/1985 | Sugimoto et al. | 364/186 |

Primary Examiner—James D. Thomas
Assistant Examiner—Thomas Lee
Attorney, Agent, or Firm—Cushman, Darby & Cushman

[57] ABSTRACT

A hierarchy system constituted by a plurality of sequence controllers, each said controller having a central processing unit, a first memory unit for storing a system program, a second memory unit for storing a sequence program, a third memory unit for storing data required for performing the sequence program, an input control unit for controlling an input signal given from an input element, an output control unit for controlling an output signal to give to an output element, a bus line which connects with the central processing unit, the first memory unit, the second memory unit, and the input/output control units. Each controller has also a transmitting and a receiving unit for transferring to and receiving from other sequence controllers status signals. The system may connect the sequence controllers in a pyramid fashion in one embodiment of this invention. Some of the controllers have a plurality of receiving control units and transmitting control units.

5 Claims, 20 Drawing Figures

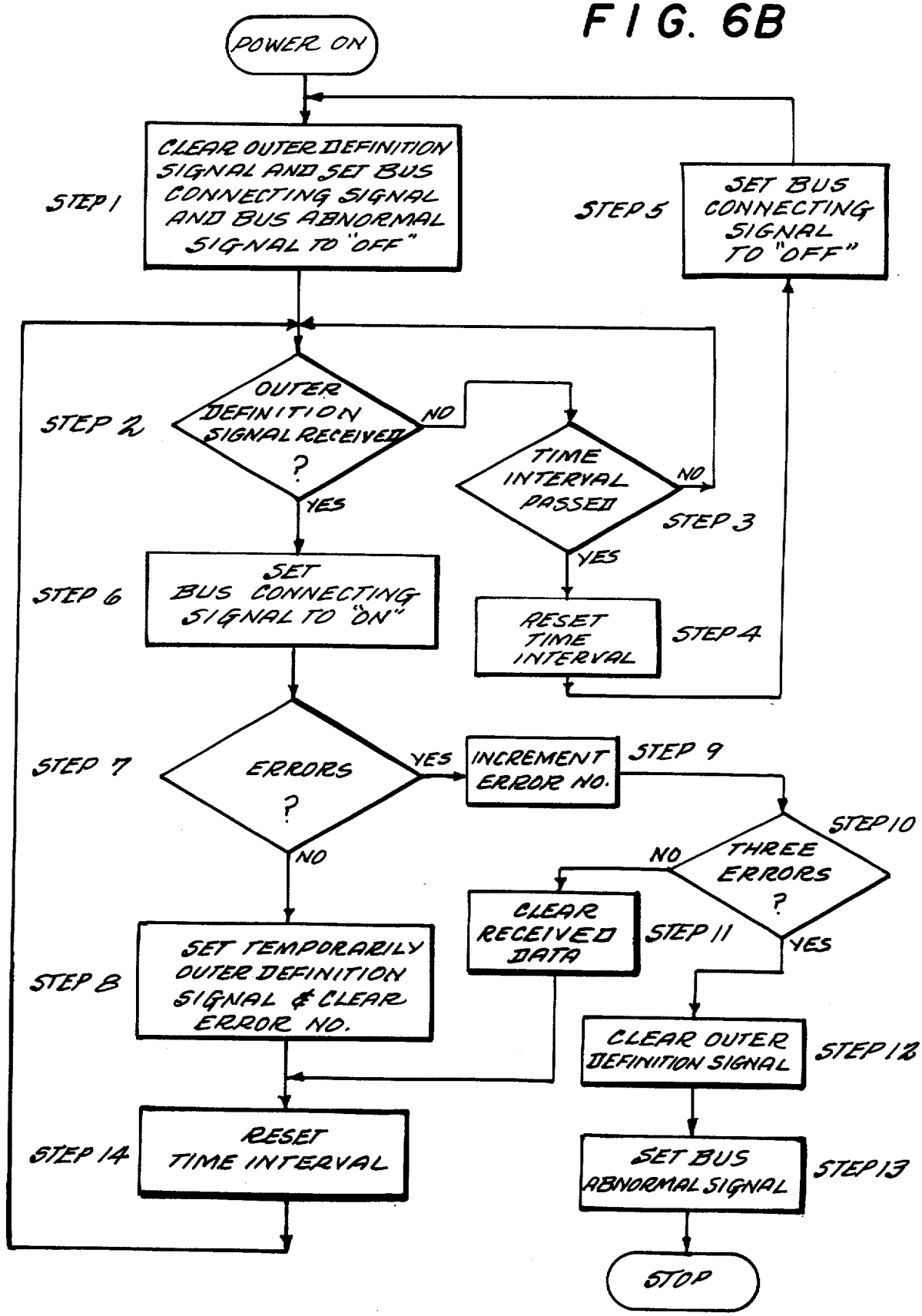

PROGRAMMABLE SEQUENCE CONTROLLER

This is a continuation of application Ser. No. 440,313 filed Nov. 9, 1982, which was abandoned upon the filing hereof.

BACKGROUND OF THE INVENTION

This invention relates to devices which sequentially control the operations of various automatic devices and more particularly to programmable sequence controllers (hereinafter referred to as "PCs") which may be connected to other PCs to enable the mutual transmitting and receiving of sequence programs.

In general, when a PC controls the sequence of operations of a mechanical device, the capability of changing the sequence or driving a plurality of devices in parallel requires upgrading of the memory capacity, processing speed or other functions. Therefore a large scale PC system is desirable.

The following two large scale PC systems presently exist:

(1) A system using one large PC 100 (having 512 or more I/O data ports, and a memory capacity of 4K or more) to directly control input/output elements is illustrated in a block diagram in FIG. 1, for example. PC 100 is connected directly to an input element 102 such as a pushbutton, and an output element 104 such as a relay coil, of a mechanical device 106 to be controlled. PC 100 is provided with an input control unit 108, an output control unit 110, a memory 112, an instruction decoder 114, an operation processing unit 116 and a program counter 118.

In such a system, since circuitry for interfacing with input/output elements 102 and 104 is within PC 100, wiring over a long distance is required between input/output elements 102 and 104 and PC 100. Furthermore, at least one wire per each input or output element is necessary. This system, therefore, is disadvantageous due to the high cost for such wiring. Furthermore, a large scale system must process a large number of instructions, and thus must operate at high speeds. This results in a significant increase of the manufacturing cost.

(2) A system where remote stations are installed for the input/output elements and data transmission is performed through the remote stations is illustrated in a block diagram shown in FIG. 2, for example. In the FIGURE, remote stations 120a, 120b..., and 120n are installed respectively near input/ output elements 102 and 104 of mechanical device 106 to be controlled. Operation processing is implemented by one high-speed PC 122, and only input data and output data are transmitted between PC 122 and remote stations 120. In this case, PC 122 is provided with a transmission control unit 124 in place of input control unit 108 and output control unit 110 shown in FIG. 1. Each remote station 120 comprises an input control unit 126, an output control unit 128 and a transmission control unit 130. This system is advantageous due to its decreased wiring cost.

In this system, a high-speed PC is required as in the case of the previously mentioned system. Moreover, all input/ output data must be transmitted between the PC and the remote stations. This system therefore, requires high-speed data transmission which disadvantageously causes the manufacturing cost to increase.

FIG. 3 illustrates a system block diagram of a commonly used PC and FIG. 4 shows a flow-chart of the operation of the PC in FIG. 3. Referring to FIG. 3, PC 132 comprises a PC control program memory 134, a PC control working memory 136, a sequence program memory 138, and an input control unit 140 and an output control unit 142 connected respectively to input-/output elements 102 and 104 of a mechanical device to be controlled. These units are interconnected with each other by a common bus 144 which, in turn, is connected to a CPU 146. In PC 132, when a power source is turned on, the whole system is initialized at STEP 1 (turning output element 104 off initializing PC working memory 136 and the like) according to the system control program stored in PC control program memory 134. Next, the ON/OFF states of input elements 102 are read through input control unit 140 and then stored in input element ON/OFF state storage areas in PC working memory 136 at STEP 2. In STEP 3, the contents of the ON/OFF state storage areas for output elements 104 stored in PC control working memory 136 are supplied to output elements 104 through output control unit 142. The sequence program is read from sequence program memory 138 one instruction at a time, and decoding is carried out at STEP 4. ON/OFF data stored in PC working memory 136 is used in this processing. The decoding continues on successive instructions until the final instruction of the sequence program at STEP 5. When the final instruction is decoded, input elements 102 are again read and thus the program's loop is repeated, so that the prescribed sequence control is attained.

SUMMARY OF THE INVENTION

Accordingly, an object of the present invention is to provide a programmable sequence controller wherein wiring between input/output elements to be controlled and an input/output interface within the PC is simplified by multiplexing and which can still perform large-scale sequence control at low cost.

To relieve the above mentioned high-speed requirement of conventional large-scale PC systems and achieve this object, the present invention employs transmitting and receiving control units and a communication network for interconnecting a plurality of PC members. The interrelating of the various sequence programs is implemented by transmitting or receiving PC status signals between the members. These status signals are transmitted or received in response to instructions of the sequence program. This arrangement creates a large-scale PC system using small PC members of relatively slow operation speed to solve the above-mentioned performance/cost problems.

In the present invention, each of a plurality of programmable sequence controllers reads sequence instructions from a program memory and implements operation control of associated input/output elements. Each programmable sequence controller has input/output control units for controlling associated input/output elements directly, and other control units for receiving and transmitting status signals. These other control units are separate from the input/output control units and enable each PC member to communicate with other PC members. Predetermined addresses are allocated to the status signals of each PC so that the various sequence programs are interrelated.

The receiving control units receive status signals referred to as "outer definition signals", from other PCs. The transmitting control units transmit status signals representing the status of that PC referred to as "inner definition signals" to other PCs. Obviously when a PC transmits an inner definition signal, it is received by the other PCs as an outer definition signal.

An error detecting circuit is preferably provided in the control unit for receiving outer definition signals. The received outer definition signals are cleared each time an error is discovered, and when more than a predetermined number of errors occur consecutively, the receiving PC controls its output elements in a fail-safe manner according to its own sequence program without the benefit of the outer definition signals.

It is also preferable that the control unit for receiving the outer definition signals and the control unit for transmitting the inner definition signals are provided respectively with memories to store outer and inner definition signals temporarily.

A plurality of PC members having the above-mentioned construction may be connected into stages in a pyramid fashion on an individual basis so that operation processing by each sequence program is carried out in each stage. Alternatively, the PC members may be connected to a common bus so that PC members are controlled on a time sharing basis in response to a timing signal of a bus controller.

Embodiments of a programmable sequence controller (PC) according to the present invention will now be described in detail with reference to the accompanying drawings.

BRIEF DESCRIPTION OF THE DRAWINGS

FIGS. 6A, 6B and 6C illustrate flowcharts of the operation of the invention;

FIG. 15 shows the truth table of a tri-state gate; and

Description of the Preferred Embodiment

Figure 1:
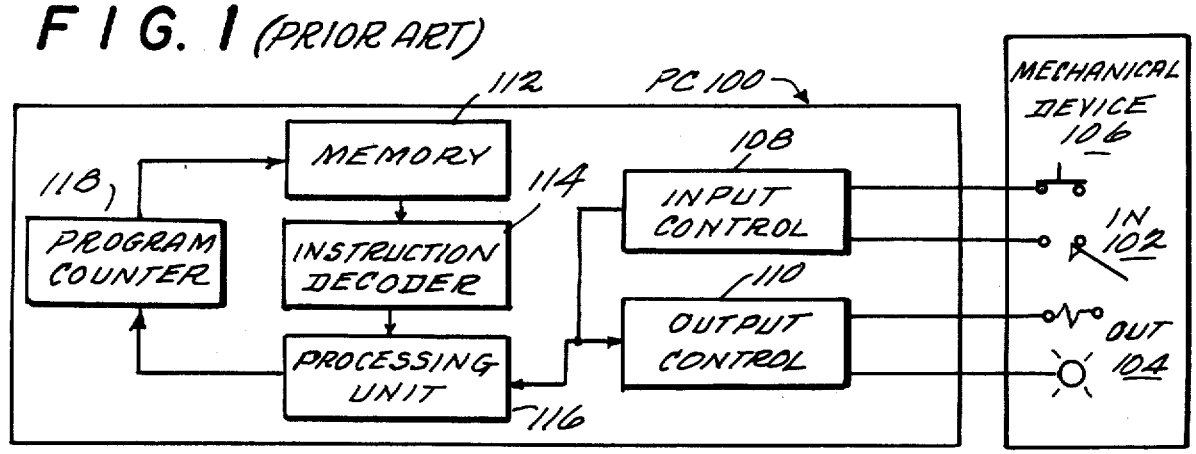
FIG. 1 illustrates a block diagram of a control system with a single PC.
Figure 2:
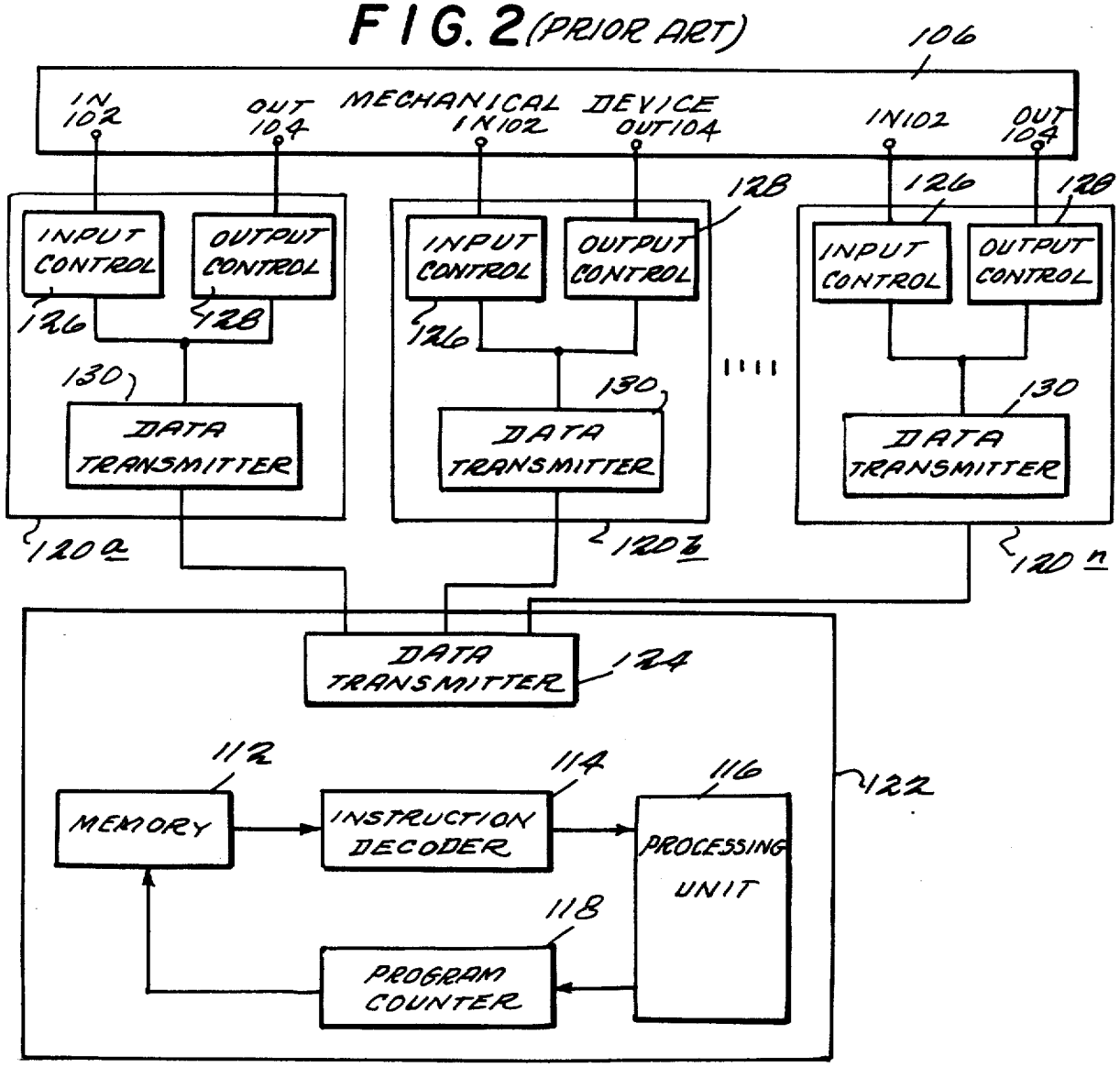
FIG. 2 illustrates a block diagram of a PC with remote stations.
Figure 3:
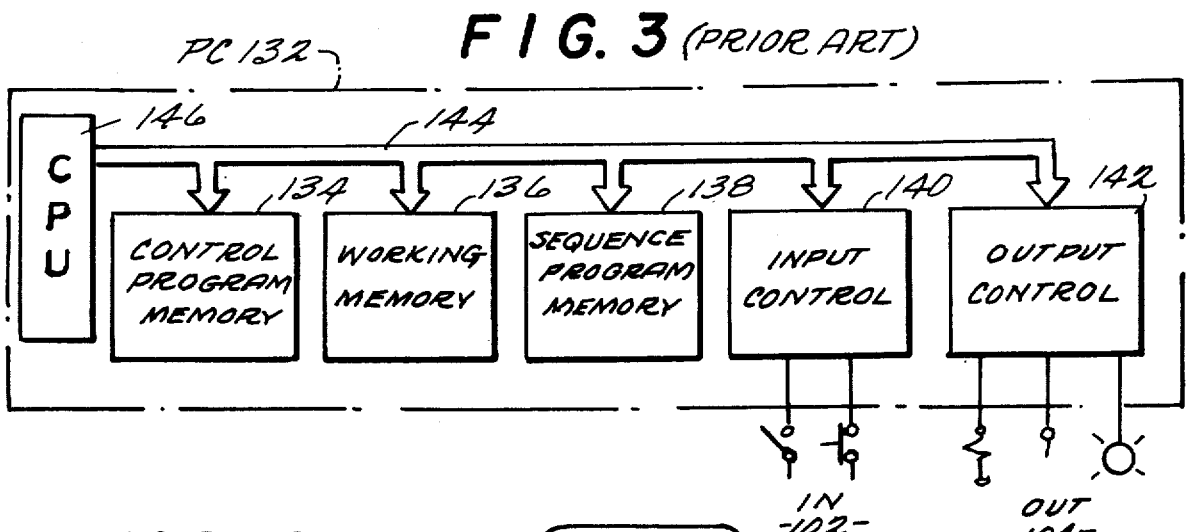
FIG. 3 illustrates a block diagram showing the components of a conventional PC.
Figure 4:
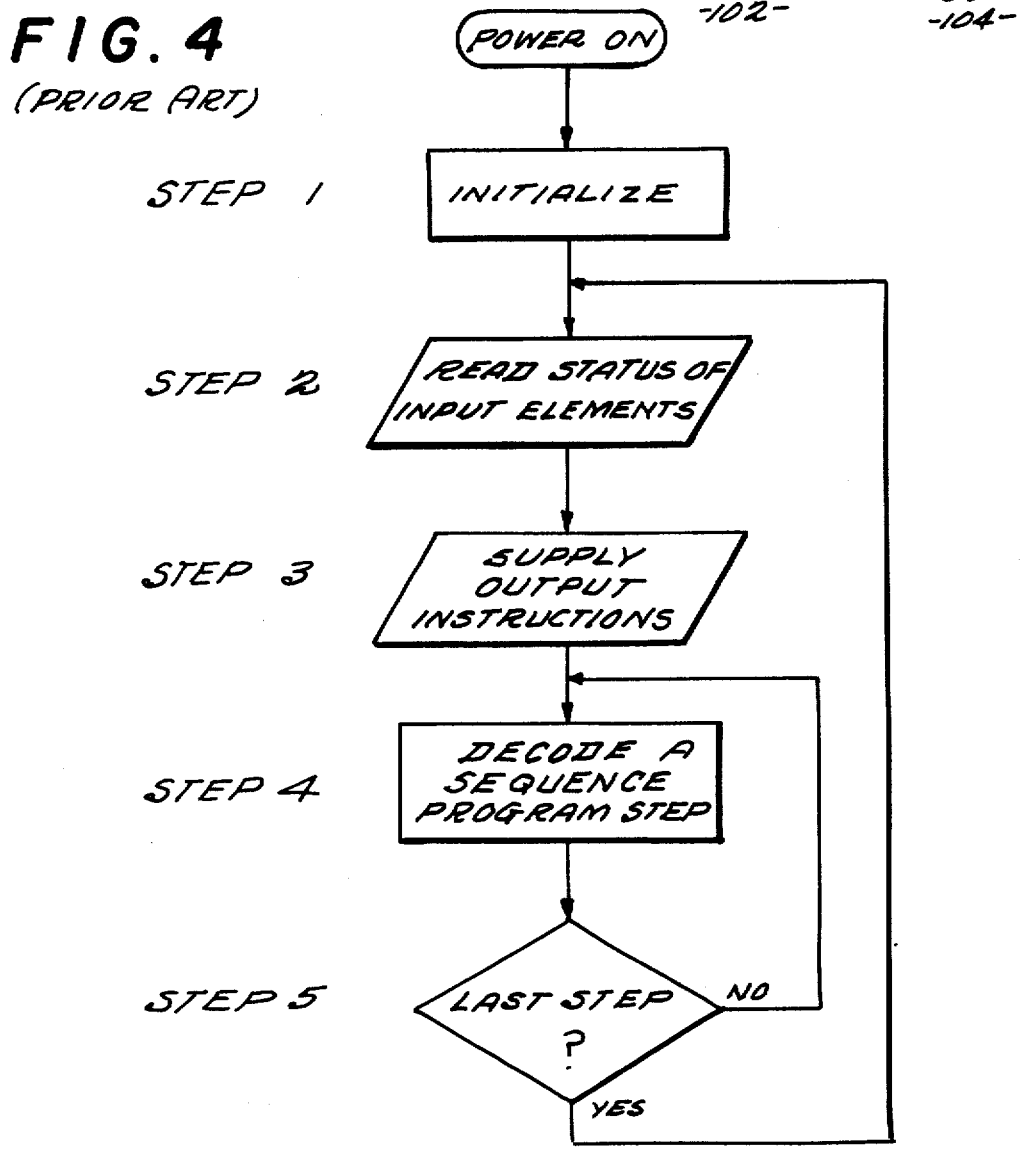
FIG. 4 illustrates a flow-chart of the operation of the PC in FIG. 3.
Figure 5:
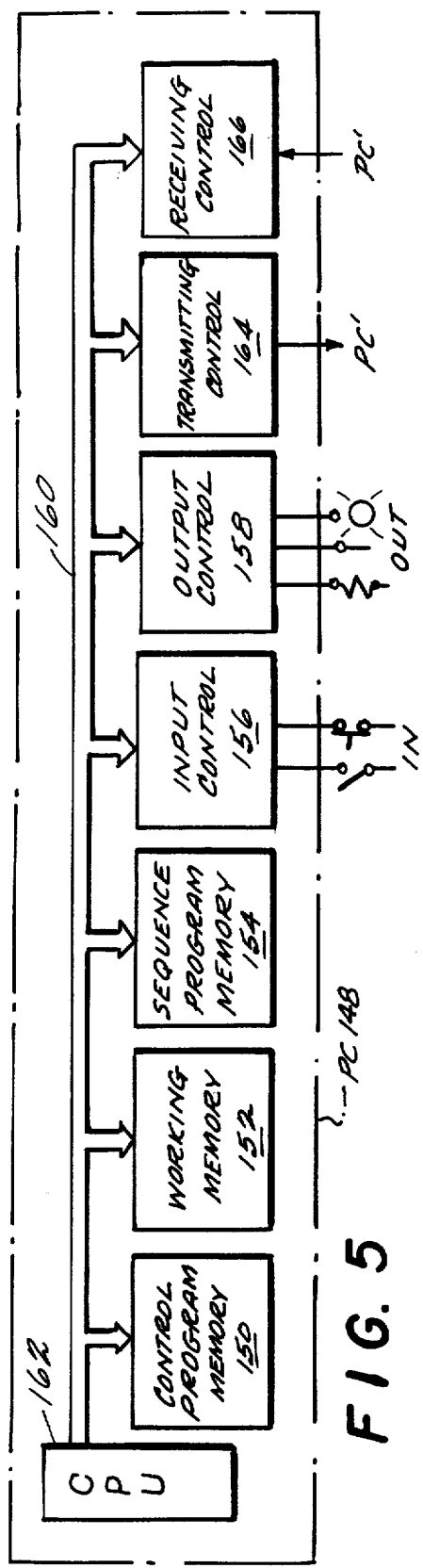
FIG. 5 illustrates a block diagram of a PC control system according to the present invention.

FIG. 5 is a block diagram illustrating PC 148 according to this invention. PC 148 in this invention has a PC control program memory 150, a working memory 152, a sequence program memory 154, an input control unit 156, an output control unit 158, a bus 160, and a CPU 162, as similarly to FIG. 3. PC 148 also has a transmitting control unit 164 for transmitting inner definition signals (signals indicating the status of PC 148) to other PCs and a receiving control unit 166 for receiving outer definition signals (signals indicating the status of other PCs) from other PCs. Transmitting control unit 164 transmits inner definitions signals, which are provided in accordance with instructions of a sequence program, to other PCs where the signals are used as outer definition signals in accordance with instructions of sequence programs in the other PCs.

Further, receiving control unit 166 receives outer definition signals from other PCs which are used in accordance with instructions of the sequence program in PC 148.

Inner definition signals are stored at specific, predetermined locations related to the other PCs to which they are to be sent in response to instruction words of the sequence program that the status of an output element is to be indicated. Similarly, outer definition signals are stored at specific predetermined locations related to the PCs from which they are received to be used in response to input instructions of the sequence program to control an input element. These inner or outer definition signals can therefore be treated freely in accordance with the sequence program of the PC.

Accordingly, a plurality of PC members, each provided with control units 164 and 166 having the above-mentioned function, are mutually connected by a communication network, and outer and inner definition signals are transmitted or received between different PC members, thereby making possible the linkage of sequence programs between PC members. Transmitting control unit 164 is provided with a memory for temporarily storing inner definition signals before they are transmitted in accordance with the sequence program to other PC members. Receiving control unit 166 is also provided with a memory for temporarily storing outer definition signals received from other PC members until the outer definition signals can be employed in accordance with the sequence program.

Figure 6A:
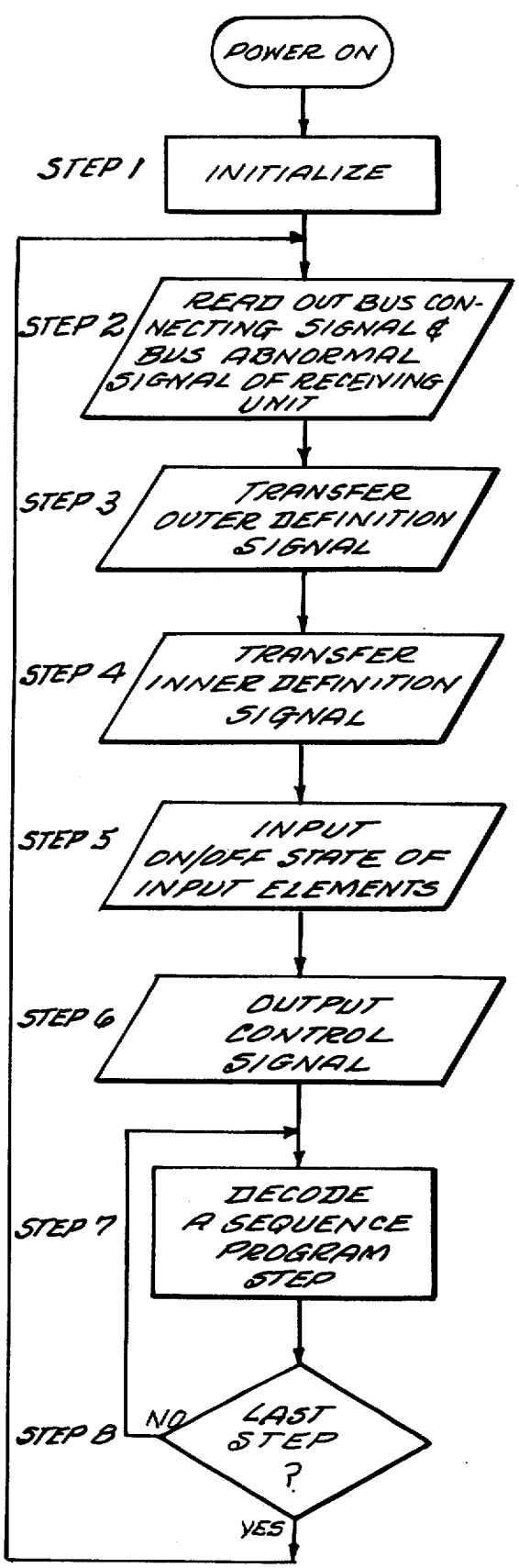
Figure 6C:
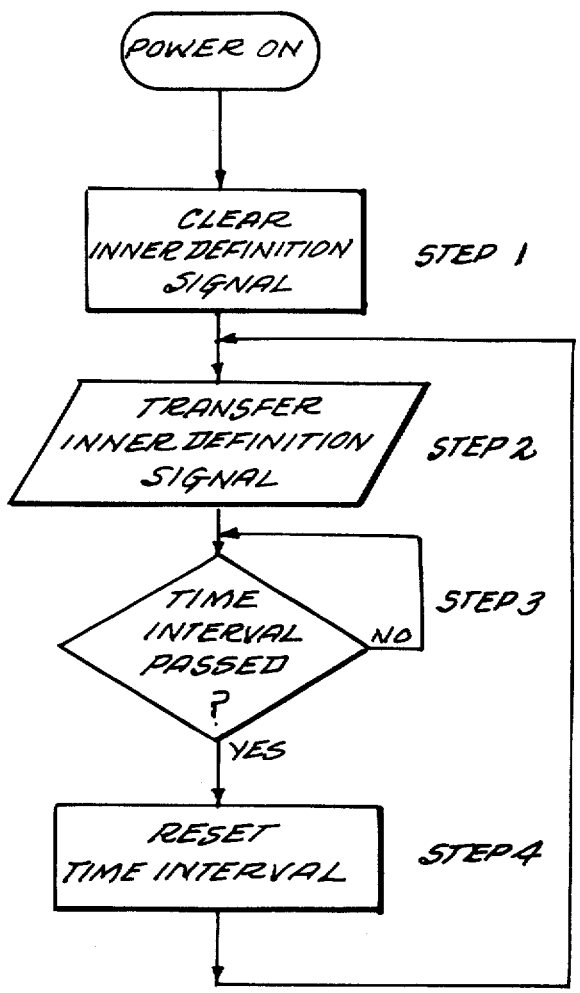

In order to realize a large-scale PC system by connecting a plurality of PC members and linking the sequence programs of the PC members, the working state of the PC members and the state of communication network must be monitored and controlled. In this invention, operation processing is implemented according to the flow-chart as shown in FIGS. 6A, 6B and 6C. FIG. 6A shows a control flow-chart of the overall operation of the PC. When a power source is turned on, the main control program performs an initializing processing (see STEP 1) of the whole system such as to turn the output elements OFF and initialize PC working memory 152 or the like. Next, the main control program reads a bus connecting signal and a bus abnormal signal from receiving control unit 166 and stores them in appropriate areas of working memory 152 at STEP 2. The bus connecting signal indicates that an outer definition signal has been received. The bus abnormal signal indicates that communications through the bus are impossible. Thus, as will be explained below, in the preferred embodiment three attempts are made to receive an outer definition signal. If all three attempts fail, the bus abnormal signal is generated.

Outer definition signals containing ON/OFF data of machines to be controlled which had been temporarily stored in receiving control unit 166 are transferred to the outer definition signal storage area of PC control working memory 152 at STEP 3. Inner definition signals specified by instructions of the sequence program are transferred from the inner definition signals storage area of PC control working memory 152 to transmitting control unit 164 and are stored there temporarily at STEP 4.

ON/OFF states of the input elements are read through input control unit 156 and stored in the ON/OFF storage area of PC control working memory 152 at STEP 5, and ON/OFF signals for controlling the output elements are output from the output element ON/OFF signal storage area of PC control working memory 152 through output control unit 158 to the output elements at STEP 6.

Sequence program instructions are read from sequence program memory 154 one at a time and decoded at STEP 7. The decoding processing is repeated until the final instruction of the sequence program is reached as determined at STEP 8. When the final instruction comes, the bus connecting signal and bus abnormal signal are again read from receiving control unit 166. Thus sequence control is attained by repetition of the above-mentioned loop.

FIG. 6B shows a control flow-chart of receiving control unit 166. When a power source is turned on, temporarily stored outer definition signals are cleared at STEP 1. The bus connecting signal and bus abnormal signal stored in receiving control unit 166 are set to an OFF state. Next, a determination is made whether outer definition signals have been received from other PCs during a prescribed time interval in STEP 2. If outer definition signals have not been received after the lapse of a prescribed time interval determined in STEP 3, the time interval is reset at STEP 4, the bus connecting signal is set to an OFF state at STEP 5 and outer definition signals are held in a cleared state at STEP 1. This process continues until an outer definition signal is received.

If reception of an outer definition signal is detected at STEP 2, the bus connecting signal is set to an ON state at STEP 6 and the received data is checked for errors in STEP 7. If no errors are detected, the received data is stored temporarily and the number of times an error is detected is set to zero at STEP 8. If the received data includes an error, the number of errors is incremented at STEP 9, and whether three consecutive errors have been detected is determined at STEP 10. If three consecutive errors have been detected, the outer definition signal being stored temporarily is cleared at STEP 12, the bus abnormal signal is set in an ON state at STEP 13 and control is stopped. If the most recently received data contains an error, but it is not the third consecutive error that has been detected in STEP 10, the received data is cleared in STEP 11 and the PC awaits receipt of the next outer definition signal. When the bus abnormal signal is set, the PC can operate in a fail-safe manner in that it controls its input elements in a safe manner without the benefit of outer definition signals.

When no error has been detected, the outer definition signal being stored temporarily is transferred to PC control working memory 152, and the time interval for receiving outer definition signal is reset again at STEP 14. The process then returns to awaiting the next outer definition signal. Thus, sequence control is attained by repetition of the above-mentioned loop.

FIG. 6C shows a control flow-chart of transmitting control unit 164. When a power source is turned on, any inner definition signals being stored temporarily are cleared at STEP 1. Then, the main loop of the routine is entered. If any inner definition signals are being stored temporarily, they are transmitted during the prescribed time interval at STEP 2. Obviously, during the first pass through this routine there are no signals to be transmitted. The time interval referred to in STEP 3 of FIG. 6B for receiving outer definition signals in receiving control unit 166 must be set sufficiently larger than the time interval for transmitting inner definition signals from each transmitting control unit 164 to give each of the PCs in the system time to transmit their inner definition signals. In such a control system, a PC can be caused to control its own output element in a fail-safe manner according to its own sequence program when it is determined that the bus is abnormal (see the more detailed description below with respect to FIGS. 7A, 7B and 7C). "A fail-safe manner" means that if the bus should become unuseable so that outer definition signals cannot be received, each PC can operate independently, if necessary, to control the associated input elements in a safe manner. Furthermore, if a specified address is allocated for storing incoming signals in the working memories of the other PCs, the sequence program can be simply restarted by a master reset or reset instruction.

After the inner definition signals are transmitted, a fixed time period must pass before the next transmission and the delay is controlled at STEP 3. After this period, the time interval for transmitting inner definition signals is reset again at STEP 4 and the next inner definition signal is transmitted. Thus, sequence control is attained by the repeated processing of this loop.

Instruction words of the sequence program used in the PC of this invention will now be described. Instruction words of the sequence program are composed of code representing both the instruction itself and an address of the element to which the instruction pertains. Elements, such as input elements, output elements, inner relay and timer or a counter can be referenced in the address of the instruction word. Since this invention uses inner definition signals, outer definition signals, bus connecting signals and bus abnormal signals, address codes are also provided for these signals.

Figures 7A, 7B, 7C:
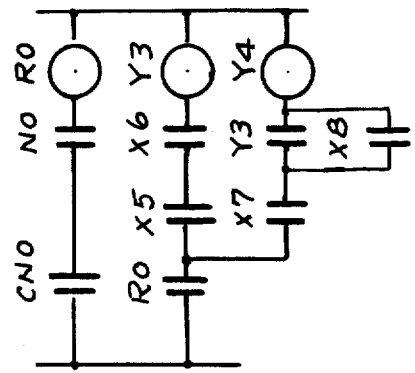
FIGS. 7A, 7B and 7C illustrate relay ladder circuit diagrams constituted by the PC of the invention.

Addresses for the various elements and signals are defined as follows:

X1-X8 ... addresses of input elements
EN1 ... address of inner definition signal
EX1 ... address of outer definition signal
CNO ... address of bus connecting signal
ALO ... address of bus abnormal signal
Y1-Y4 ... addresses of output elements
RO ... address of inner relay FIGS. 7A, 7B and 7C show examples of relay ladder diagrams illustrating sequence programs based on the above-mentioned definition. In these figures, the parallel lines mean "check" and the circle means "do" or "energize". The address over each symbol specifies the element or signal referred to. FIG. 7A shows a diagram wherein the inner definition signal, addressed EN1, is transmitted outwards when input element X1 and either input element X2 or input element X3 are generating appropriate signals. FIG. 7B shows a diagram wherein the outer definition signal, addressed EX1, and input element X3 are monitored and output element Y1 is activated in response thereto. FIG. 7C shows a circuit wherein the bus connecting signal, addressed CNO, and the bus abnormal signal, addressed ALO, are monitored and an inner relay is actuated in response thereto. Note that in the next line of FIG. 7C, output elements Y3 and Y4 can only be energized in response to the actuation of the inner relay. Thus the energization of output elements Y3 and Y4 are interlocked and protection of the PC and the machine being controlled is provided in a failsafe manner.

Examples of applications of the PC of this invention will now be described. In all of the examples, a large-scale PC system is formed by interconnecting a plurality of PC members.

Figure 8:
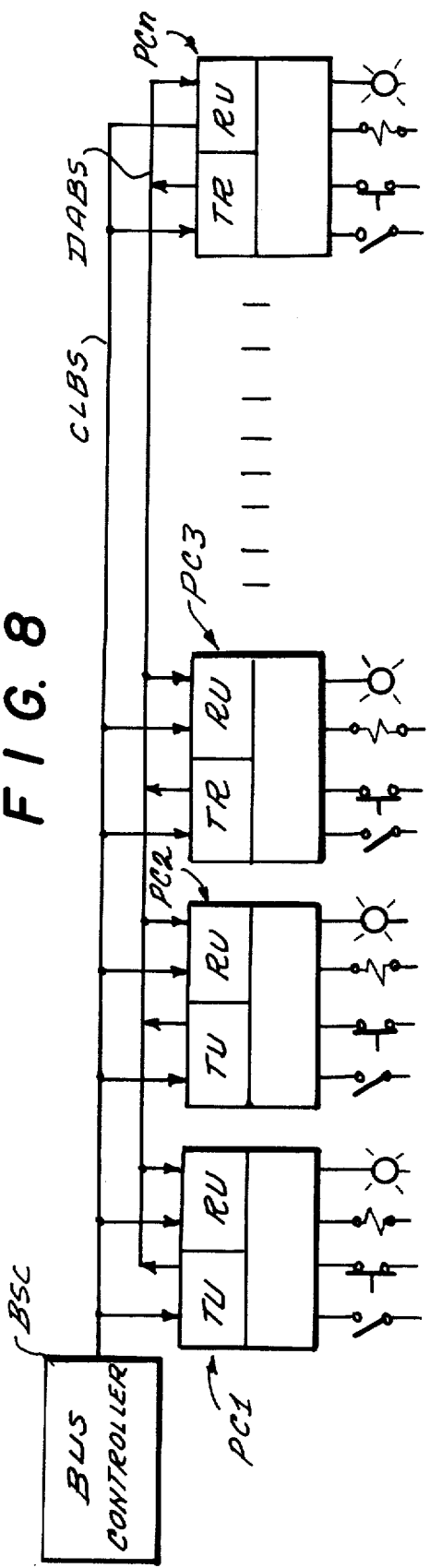
FIG. 8 illustrates in block diagram form another embodiment of a multiplex PC system constituted by the PC of the invention.

FIG. 8 shows a system in block diagram form wherein a multiplex PC system is formed by connecting PC members to a common bus. In this system, a plurality of PC members ($PC_1$-$PC_n$) are connected through data bus DABS between respective transmitting control units (TU) and between respective receiving control units (RU). A bus controller BSC is connected to each of the transmitting control units and receiving control units of the PCs through a clock bus CLBS, clock signals generated by bus controller BSC are transmitted to the PCs through clock bus CLBS. An inner definition signal of each PC is therefore transmitted during a predetermined one of time divisions 1 through n by means of clock signals from bus controller BSC. Each PC is assigned a time division for transmission.

Figure 9:
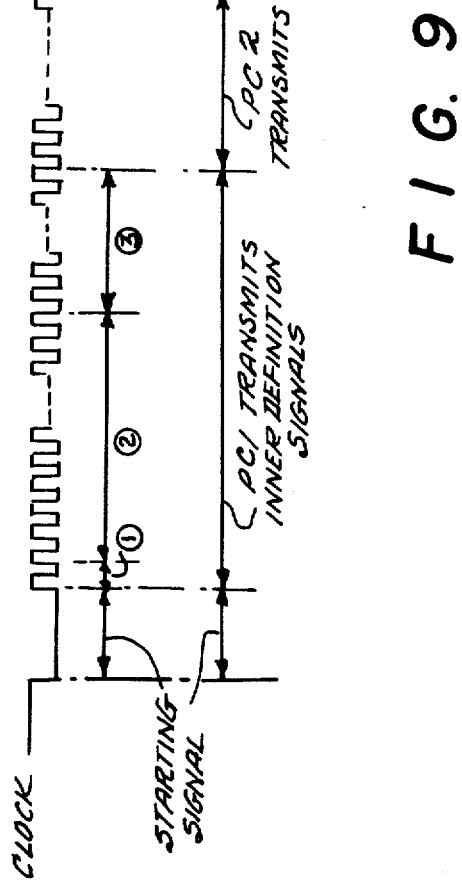
FIG. 9 illustrates a wave-form chart showing the control operation of the multiplex PC system in FIG. 8.

Specifically, action of the system will now be described referring to clock signal waveforms shown in FIG. 9. First, a starting synchronous signal corresponding to several clock periods is generated by bus controller BSC. Transmitting control units TU and receiving control units RU of the PCs are synchronized by the starting synchronous signal. The transmitting times of the inner definition signals of the PCs (PC1-PCN) are set in sequence from the next clock signal. As shown in FIG. 9, each time period for transmitting an inner definition signal includes three portions 1, 2 and 3. In the first portion having a duration of one clock signal period, the working state of the particular PC is transmitted. When the PC is in a normal working state, for example, the PC outputs a "Ready" signal on data bus DABS. During the second portion, the inner definition signals are actually transmitted. One inner definition signal is transmitted during each clock pulse. Thus the second portion of the clock signal establishes the timing interval when the ON/OFF states of 0-n inner definition signals are transmitted. During the third portion lasting 16 clock pulses, error detecting signals, CRC are transmitted. $PC_1$-$PC_n$ transmit inner definition signals in a sequence at the presciped timing. Each transmitting control unit TU transmits the working state, the inner definition signals and the error detecting signals to data bus DABS in response to the timing clock. The receiving control unit RU receives data from the transmitting control units TU in accordance with the above-mentioned timing, and stores the bus connecting signal, bus abnormal signal and outer definition signals in addresses corresponding to the PC from which they were received.

Figure 10:
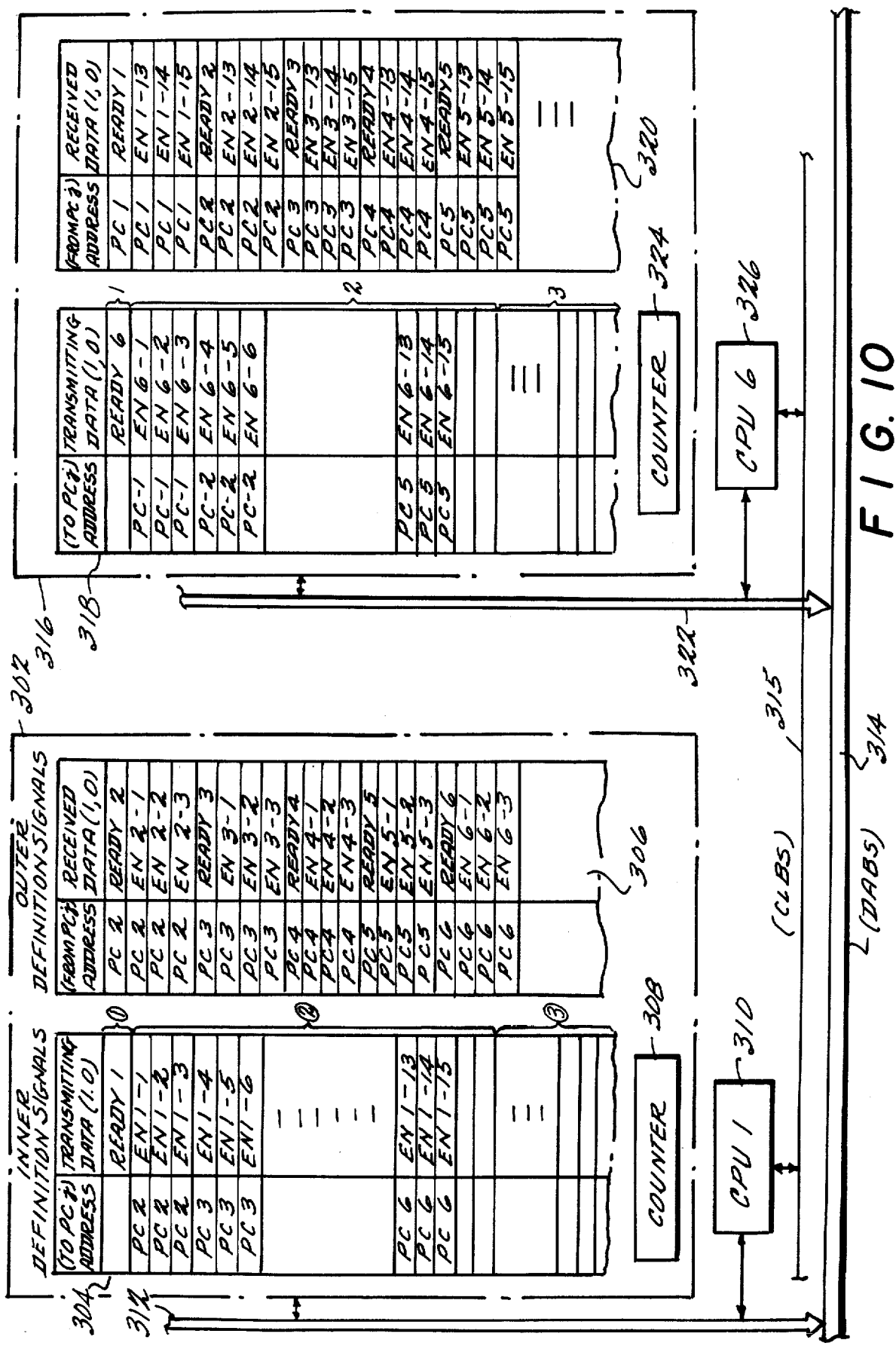
FIG. 10 shows the manner in which inner and outer definition signals are stored in working memory.

FIG. 10 illustrates inner and outer definition signals stored in each working memory of PC1 - PC6, where the suffix number n of PCn in FIG. 8 is "6". In FIG. 10, data bus 314 (DABS) and a clock bus 315 (CLBS) are connected to PC1 -PC6. A working memory 302 in PC1 is connected through a bus 312 to CPU 310 of PC1. In the same way, a working memory 316 in PC6 is connected through a bus 322 to CPU 326 of PC6. Working memory 302 has memory areas 304 and 306 for inner and outer definition signals, repectively. Working memory 302 also has a counter portion 308. Similarly, working memory 316 has memory areas 318 and 320 for inner and outer definition signals, respectively, and a counter portion 324.

Inner definition signals generated by PC1 are stored in working memory area 304. The maximum number of inner definition signals that can be sent to any one PC in this embodiment is three. They are transferred in sequence from PC1 to PCi (i≠1) as shown in FIG. 10. For example, inner definition signals EN1-4, En1-5 and EN1-6 are transferred from PC1 to PC3, and inner definition signals EN1-13, EN1-14 and EN1-15 are transferred from PC1 to PC6. Inner definition signals EN1-1 to EN1-15 are transferred to other PCs in synchronism with clock signals as explained above in conjunction with FIG. 9.

Marks 1, 2, and 3 at the right sides of memory areas 304 also correspond to the marks shown in FIG. 9. The first portion of a transfer sequence corresponds to a signal "Ready 1". When the signal "Ready 1" is high (=1) the operating state of PC1 is normal, and that data EN1-1, EN1-2, ... EN1-15 to be transmitted during the second portion will be correct information. However, when the signal "Ready 1" is low (=0), the operating state of PC1 is abnormal and data transmitted during the second and third portions will be wrong information.

Inner definition signals transferred from PC2-PC6 to PC1 are stored in working memory area 306 as outer definition signals of PC1. For example, signals such as "Ready 2", EN2-1, EN2-2, and EN2-3 in memory area 306 are transferred from PC2. When signal "Ready 2" is low (=0), data EN2-1, EN2-2, and EN2-3 are not treated as correct information in PC1-PC6.

PC6 also has working memory areas 318 and 320 for inner and outer definition signals, and a counter portion 324.

Figure 11:
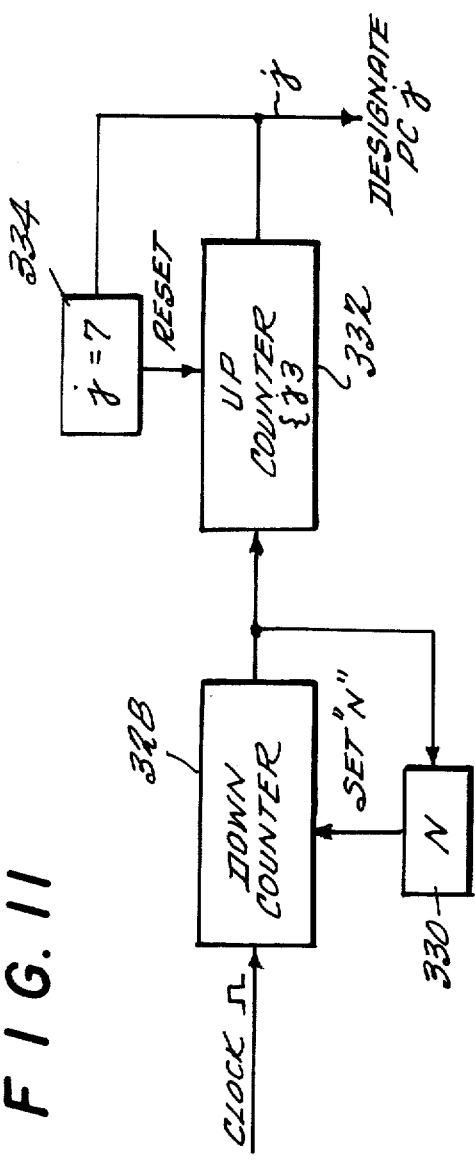
FIG. 11 shows a circuit diagram of the counter portion in FIG. 10.

Counter portions 308 and 324 are similar, and their construction will now be explained with respect to FIG. 11. In FIG. 11, a constant generator 330 supplies the value "N" to a down counter 328 at an initializing state. The value 'N' designates the numbers of clock pulses during the first through third portions of a transfer cycle.

An up counter 332 designates one of sequence controllers PC1-PC6 by using the value of "j" which is the contents of counting. Down counter 328 increments up counter 332 each time the value in down counter 328 reaches zero. After up counter 332 counts up to "7", a comparator 334 resets up counter 332.

Therefore, CPUj in PCj may recognize the value "j" from up counter 332.

When the value "j" in up counter 332 corresponds to the designation of that PC, the CPU in that PC operates to transfer inner definition signals to PC1-PC6 (except for that particular PC) during the next succeeding "N" clock pulses. When the value of the up counter 332 reaches "7" all of the inner definition signals have been transferred which correspondingly means that all of the outer definition signals have been received.

After transferring or receiving, each PC begins to produce output instructions for the output elements in accordance with its own sequence program by making use of received outer definition signals stored in the working memory shown in FIG. 10. Then after the produced output instructions are applied to output elements in each PC, logical states of all of the input elements and output elements are read through the input and output control units, and the read data are stored in the working memory areas for the input and output signals. Then, inner definition signals are again formed in each PC by using the stored input and output data, and transferred to other PCs as mentioned above.

Figure 12:
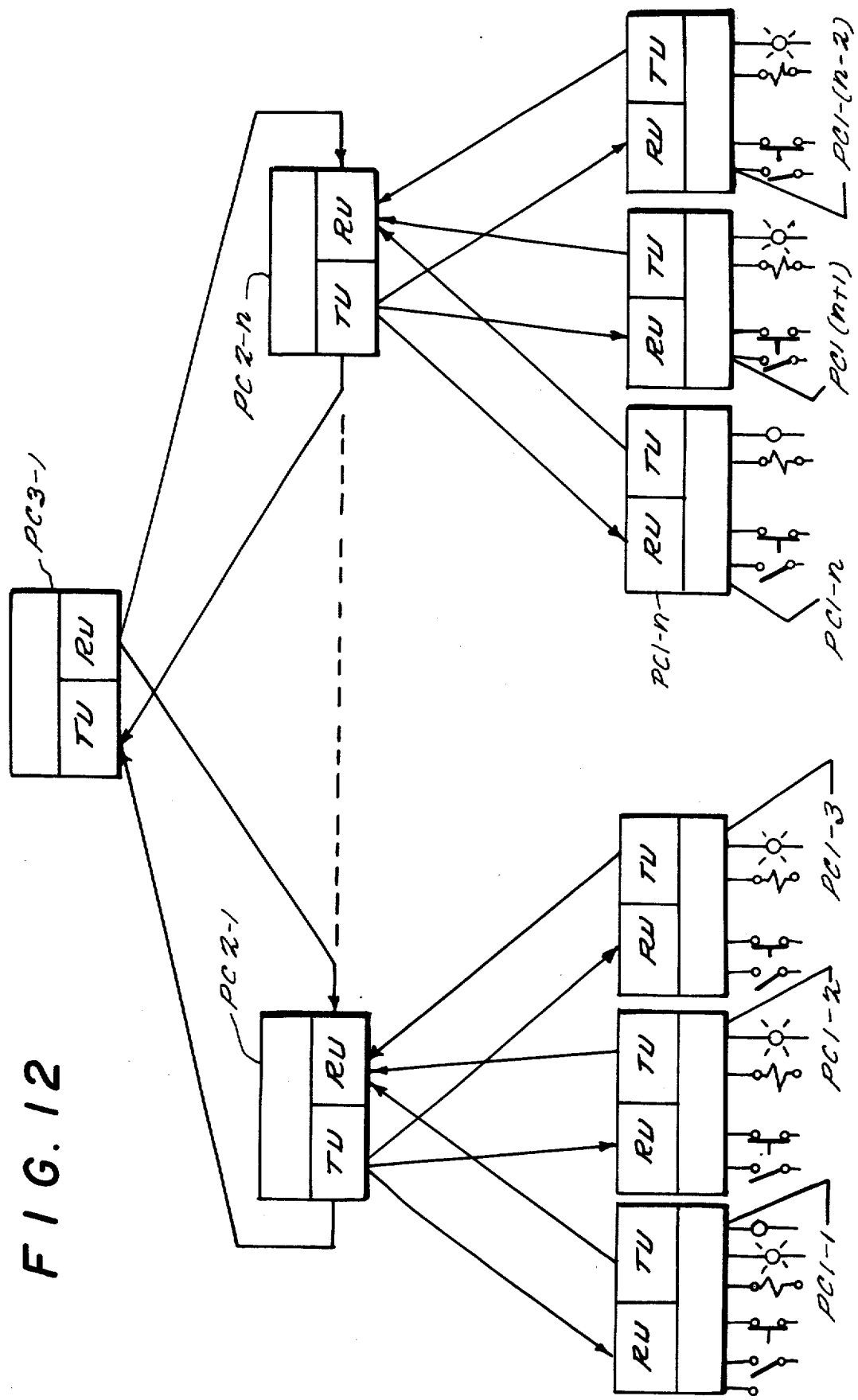
FIG. 12 is a block diagram of an embodiment of a multiplex PC system constituted by the PC of the invention.

FIG. 12 shows a system in block diagram form wherein a multiplex PC system of "n" stages includes a number of PCs connected to fewer upper level PCs on individual communication lines. Thus, an upper level PC member, for example, PC3-1, PC2-1 and PC2-n, are provided with a number of communication bus lines corresponding to the number of PC members of the next lower level connected to it. Obviously, each transmitting control unit TU is coupled to the receiving control unit RU of the other PC and vice versa, as shown in FIG. 12. The sequence program of each PC member is made by preparing a sequence program for each stage level to enable control of the entire system.

Figure 13:
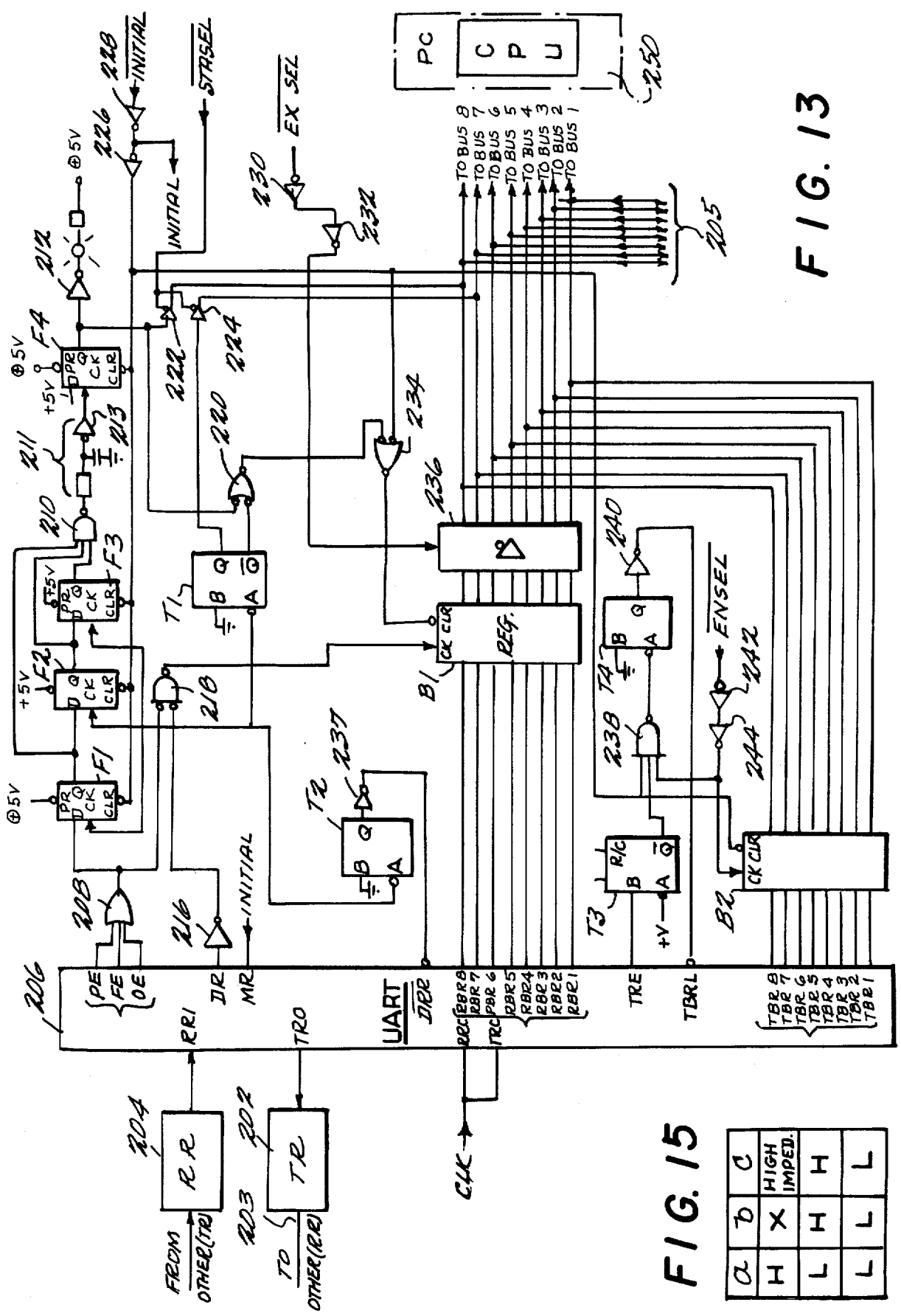
FIG. 13 is a circuit diagram of an embodiment of a receiving control unit and a transmitting control unit in accordance with the present invention.

FIG. 13 is a detailed circuit diagram of transmitting and receiving control units for treating inner and outer definition signals to/from the working memory in PC 250. In the FIG. 13, numerals 202 and 204 designate transmitting and receiving circuits, respectively. Numeral 206 designates an Universal Asynchronous Receiver Transmitter (UART) which produces or processes signals such as error signals on lines PE, FE and OE for outputting to OR gate 208, data receiving control signals on lines DR and DRR, received data on data lines RBR1-8, transmitted data TBR1-8, a transmitting register empty signal on line TRE, a transmitting buffer register load signal on line TBRL and a basic clock signal on line CLK.

The circuit portions including OR gate 208, flip-flops F1, F2, F3 and F4, NAND gate 210, inverter 212, and light emitting diode (LED) 214 constitute a circuit for detecting the times of error occurance.

When initialization signal $\overline{INITIAL}$ becomes low flip-flops F1–F4 are cleared. After initialization, a receiving port RRi of UART 206 receives outer definition signals through receiving circuit 204. If the received outer definition signals should include errors, UART 206 produces error signals such as PE (parity error), FE (format error) and OE (over run error).

A primary counter consisting of flip-flop F1–F3 counts the number of errors in response to clocking signals on the DR line produced by UART 206. When three errors are consecutively detected, the output of NAND gate 210 becomes low ($=0$). This causes LED 214 to light through differentiation circuit 211, inverter 213 and flip flop F4.

Figure 14:
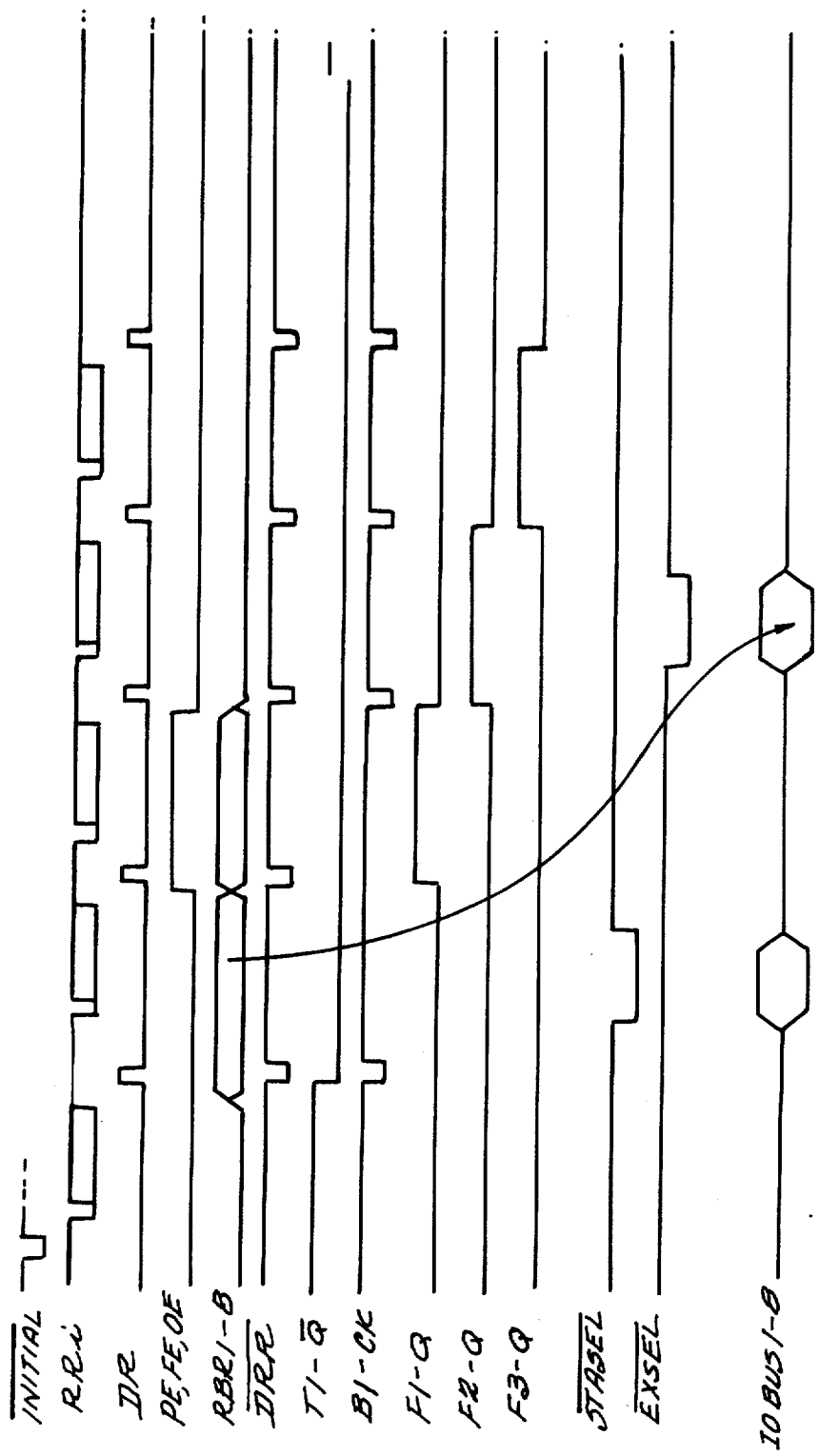
FIG. 14 shows a time chart for explaining the relationships among signals in FIG. 13.

The error detecting process mentioned above illustrated in the time charts for the signals on lines $\overline{INITIAL}$, RRi, DR, PE, FE and OE at the top of FIG. 14. The output of OR gate 208 and the signal on line DR through inverter 216 are applied to NAND gate 218 which has inverters at its inputs. Outer definition signals are received in UART 206 through receiving circuits 204 and are transferred to a buffer register B1 on lines RBR1–8 in response to the output of gate 218 when the output signal changes from high to low. However, if the outer definition signals include errors, signals on lines RBR1–8 are not transferred to buffer register B1. The signal on line DR is also applied through inverter 216 to input terminal A of a timer T1. In the preferred embodiment, time T1 is chip SN74123 manufactured by the Texas Instruments Company.

The output of flip-flop F4 and output $\overline{Q}$ of timer T1 are applied to NOR gate 220. Furthermore, the output of NOR gate 220 and output of inverter 226 are applied to NOR gate 234 with inverters at its inputs. Therefore, except for the timing of initialization, when timer T1 times out ($\overline{Q}$ becomes 1), or when the output Q of flip-flop F4 becomes "1", buffer register B1 is cleared by the output signal of gate 234.

Gates 222 and 224 are tri-state and are provided with the output Q of flip-flop F4 and the output Q of timer T1, respectively. The gating signal for tri-state gates 222 and 224 is status selecting signal $\overline{STASEL}$. Therefore, when signal $\overline{STASEL}$ is applied, both output Q of F4 and output Q of timer T1 are transferred through gates 222 and 224 to IOBUS 8 and IOBUS 7, respectively. If IOBUS 8 becomes high, three consecutive errors have been detected. If IOBUS 7 becomes high, data receiving signal DR has not been generated, indicating that outer definition signals have not been transferred in UART 206 during the predetermined time interval set by timer T1.

Signal DR is also applied through inverter 216 to an input terminal A of a timer T2 which, in the preferred embodiment is a SN74123 chip manufactured by the Texas Instruments Company. After a predetermined time lapse from receipt of a signal DR, output Q of timer T2 is applied through inverter 237 to UART 206 as a signal $\overline{DRR}$. UART 206 employs signal $\overline{DRR}$ to check for the normal arrival of outer definition signals to it. When a signal $\overline{EXSEL}$ (outer definition selecting signal) is generated by PC 250, it is applied through inverters 230 and 232 to control tri-state gates 236. Gates 236 transfer outer definition signals being stored in buffer register B1 through IOBUS 1–8 to working memory areas in PC 250 (see contents of B1 at IOBUS 1–8 in FIG. 14). FIG. 15 shows a truth table of a tri-state gate in which "a" designates a gating signal and "b" and "c" designate an input signal and an output signal, respectively.

Inner definition signals, being stored in the working memory in PC 250, are transferred to buffer register B2 through IOBUS 1–8, and UART 206 loads the inner definition signals in buffer register B2 to a buffer register in UART 206 at a suitable time. Then, it transmits through transmitting circuit 202 to other PCs after converting the inner definition signals to serial data. A terminal CLR of buffer register B2 receives initialization signal $\overline{INITIAL}$. A terminal CK of buffer register B2 receives a signal $\overline{ENSEL}$ through inverters 242 and 244 from PC 250 in order to load inner definition signals from PC 250 to buffer register B2. When signal $\overline{ENSEL}$ is applied to buffer register B2, inner definition signals are transferred through IOBUS 1–8 to buffer register B2 as mentioned above.

The circuit portions including timers T3, T4, NAND gate 238 and inverter 240 control the timing at which inner definition signals being stored in buffer register B2 are transferred to UART 206. A signal TRE (transmitting buffer register empty) becomes high ($=1$), when the buffer register in UART 206 is empty; that is, all definition signals have been transferred to other PCs from terminal TRO in UART 206. After the lapse of a time interval determined by timer T3, as long as signals INITIAL and ENSEL are not applied, the output of gate 238 becomes low ($=0$), and timer T4 is thus actuated. After the lapse of a time interval determined by timer T4, output Q of timer T4 is applied through inverter 240 to UART 206 as a signal TBRL (transmitting buffer load).

Figure 16:
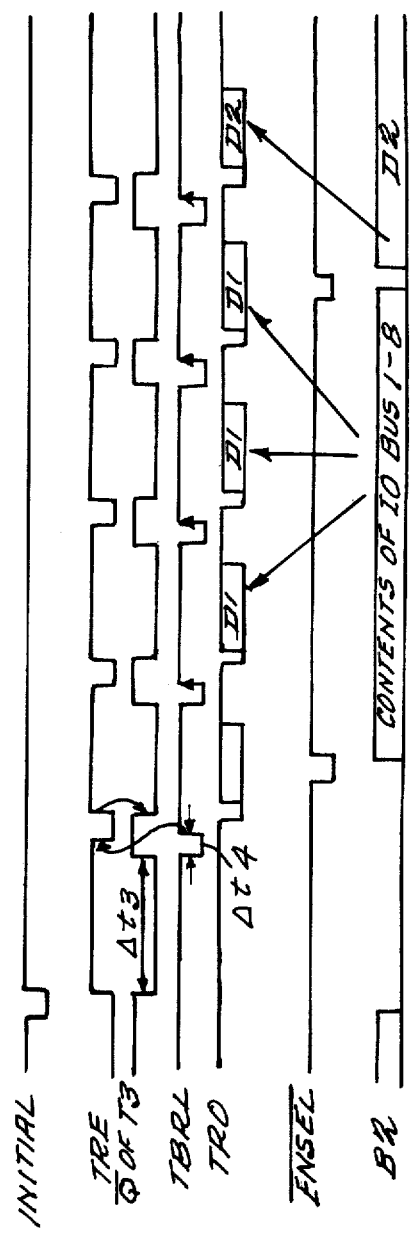
FIG. 16 shows a timing chart for explaining the relationships among other signals in FIG. 13.

FIG. 16 illustrates the relationships between buffer register B2 and UART 206 by time charts concerning signals TRE, TBRL, TRO, ENSEL and contents of B2. In FIG. 16, when UART 206 receives signal INITIAL from PC 250, UART 206 produces signal TRE, then timer T3 produces a low signal for a predetermined period. After the lapse of $\Delta t3$ in timer T3, the output Q of timer T3 returns to a high level (=1), causing the output Q of timer T4 to be applied through inverter 240 to UART 206 as signal TBRL having a low level. After the lapse of $\Delta t4$ in timer T4, signal TBRL becomes high. During the time interval of $\Delta t4$, inner definition signals stored in buffer register B2 are transferred to UART 206.

As shown in FIG. 16, when signal ENSEL is applied, inner definition signals are transferred through IOBUS 1–8 in parallel to buffer register B2, and these signals are changed to serial data in UART 206, and transferred to other PCs from transmitting circuit 202. As shown in FIG. 16, these inner definition signals in UART 206 are transferred repeatedly to transmitting line 203. Data D1 (see FIG. 16), corresponding to inner definition signals stored in buffer register B2 as a result of a single signal $\overline{\text{ENSEL}}$, are transferred to UART 206 from buffer register B2 in sets each time a signal TBRL produces. In FIG. 16, three TBRL signals are necessary to transfer all of Data D1.

Signals $\overline{\text{INITIAL}}$, $\overline{\text{STASEL}}$, $\overline{\text{EXSEL}}$ and CLK are formed in PC 250 including the CPU therein.

In the embodiment illustrated in FIG. 12, a separate control circuit similar to that shown in FIG. 13 must be employed for each PC to which PC 250 is connected. Thus, in FIG. 12, if PC 250 is PC2-1, then 4 control circuits must be provided, one connected to each of PC3-1, PC1-1, PC1-2 and PC1-3. Lines 250 are employed to connect the control circuits in parallel with respect to IOBUS 1–8.

In FIG. 12, the main function of PC2-1 is to form signals which are logical (or boolean) combinations of outer definition signals transferred from the lower PCs. For example, in the following boolean equations:

$$INTLK(1) = EN1 \cdot EN2 \cdot EN3$$

$$INTLK(2) = EN1 + EN2 + EN3$$

signals INTLK(1) and INTLK(2) are used as interlocking signals in PC1-1, PC1-2 and PC1-3, and signals EN1, EN2 and EN3 are outer definition signals transferred from PC1-1, PC1-2 and PC1-3 to PC2-1. It is advantageous that PCs at upper stages form signals such as INTLK(1) and INTLK(2) which are necessary for the PCs in lower stages.

As is clear from the above-mentioned embodiments, the PC according to the present invention is provided with input/output control units connected to usual input/output elements, such as limit switches, pushbutton switches, electromagnetic valves and relays or the like. Furthermore, PCs according to the present invention include transmitting/receiving control units to interconnect different PC members. The transmitting/receiving control units transmit or receive the inner and outer definition signals smoothly between different PC members, thereby linking the various sequence programs of the PCs. A large-scale multiplex PC system is thus realized at low cost.

Although the preferred embodiments of the invention have been described above, a multiplex remote station PC system can be realized by using a remote station also as a terminal device for input/output elements of the PC in this invention. Other design changes can also be carried out without departing from the spirit of the invention.

What is claimed is:

1. A sequence controller including means for connection to at least one other sequence controller comprising:
   a central processing unit for generating an inner definition signal related to a status of said sequence controller;
   first memory means for storing a system program for said sequence controller;
   second memory means for storing a sequence program;
   third memory means for storing data required for performing said sequence program;
   first control means for receiving an input signal from an input element;
   second control means for transmitting an output signal to an output element;
   bus means for interconnecting said central processing unit, said first memory means, said second memory means, said third memory means and said first and second control means;
   transmitting means for transmitting said inner definition signal related to a status of said sequence controller to said at least one other sequence controller; and
   receiving means for receiving an outer definition signal related to a status of said at least one other sequence controller from said at least one other sequence controller;
   said inner and outer definition signals being stored at predetermined addresses in said third memory means;
   universal asynchronous receiver transmitter (UART) connected to both of said receiving and transmitting means for converting said outer definition signal to parallel mode data and for converting said inner definition signal supplied from said central processing unit to serial mode data, said UART executing a parity check, format check and overrun check concerning said outer definition signal arrived at said UART, and generating an error detection signal representing a detection of at least one of a parity check error (PE), a format error (PE) and a overrun error (OE), and generating a data ready signal (DR);
   a first buffer register for receiving said parallel mode data of said outer definition signal from said UART;
   a second buffer register for receiving parallel mode data of said inner definition signal through said bus means from said central processing unit, said first and second buffer registers being connected to said UART;
   gate means for allowing said outer definition signal in said first buffer register to transmit to said third memory means through said bus means; and
   data clear means for clearing a content of the first buffer register in response to said error detection signal being consecutively generated for a predetermined number of times.

2. A sequence controller as in claim 1 wherein said receiving means includes a memory for temporarily storing an outer definition signal received from another sequence controller.

3. A sequence controller as in claim 1 wherein said transmitting means includes a memory for temporarily storing an inner definition signal to be sent to another sequence controller.

4. A sequence control system including a plurality of interconnected sequence controllers, said sequence controllers being organized in at least two levels, each of said sequence controllers on an upper level being individually connected to at least one of said sequence controllers on a lower level, each of said sequence controllers comprising:

- a central processing unit for generating inner definition signals related to a status of said sequence controllers;
- first memory means for storing a system program for said sequence controller;
- second memory means for storing a sequence program;
- third memory means for storing data required for performing said sequence program;
- bus means for interconnecting said central processing unit, said first memory means, said second memory means, and said third memory means;
- one transmitting means being provided for each of said sequence controllers and being connected to at least one other of said sequence controllers, each of said one transmitting means being provided for transmitting an inner definition signal related to a status of its associated sequence controller to said at least one other of said sequence controllers;
- one receiving means being provided for each of said sequence controllers and being connected to at least one other of said sequence controllers, each of said one receiving means being provided for receiving an outer definition signal related to a status of one of said at least one of said sequence controllers; and
- said inner and outer definition signals being stored at predetermined addresses in said third memory means;
- said sequence controller at each level having a sequence program for controlling operation processing states of said sequence controllers at a lower level than said each level;
- universal asynchronous receiver transmitter (UART) connected to both of said receiving and transmitting means for converting said outer definition signal to parallel mode data and for converting said inner definition signal supplied from said central processing unit to serial mode data, said UART executing a parity check, format check and overrun check concerning said outer definition signal arrived at said UART, and generating an error detection signal representing a detection of at least one of a parity check error (PE), a format error (FE) and a overrun error (OE), and generating a data ready siganl (DR);
- a first buffer register for receiving said parallel mode data of said outer definition signal from said UART;
- a second buffer register for receiving parallel mode data of said inner definition signal through said bus means from said central processing unit, said first and second buffer registers being connected to said UART;
- gate means for allowing said outer definition signal in said first buffer register to transmit to said third memory means through said bus means; and
- data clear means for clearing a content of the first buffer register in response to said error detection signal being consecutively generated for a predetermined number of times;
- at least some of said processing controllers including first control means for receiving an input signal from an input element and second control means for transmitting an output signal to an output element.

5. A sequence control system having a plurality of sequence controllers, said each controller comprising:

- a central processing unit for generating inner definition signals related to a status of said sequence controllers;
- first memory means for storing a system program for said sequence controller;
- second memory means for storing a sequence program;
- third memory means for storing data required for performing said sequence program;
- first control means for receiving an input signal from an input element;
- second control means for transmitting an output signal to an output element;
- bus means for connecting with said central processing unit, said first memory means, said second memory means, said third memory means and said first and second control means;
- transmitting means for transmitting said inner definition signal related to a status of said sequence controller to another of said sequence controllers; and
- receiving means for receiving said outer definition signal related to a status of another of said sequence controllers from said another of said sequence controllers;
- said inner and outer definition signal being stored in predetermined addresses in said third memory;
- universal asynchronous receiver transmitter (UART) connected to both of said receiving and transmitting means for converting said outer definition signal to parallel mode data and for converting said inner definition signal supplied from said central processing unit to serial mode data, said UART executing a parity check, format check and overrun check concerning said outer definition signal arrived at said UART, and generating an error detection signal representing a detection of at least one of a parity check error (PE), a format (FE) and a overrun error (OE), and generating a data ready signal (DR);
- a first buffer register for receiving said parallel mode data of said outer definition signal from said UART;
- a second buffer register for receiving parallel mode data of said inner definition signal through said bus means from said central processing unit, said first and second buffer registers being connected to said UART;
- gate means for allowing said outer definition signal in said first buffer register to transmit to said third memory means through said bus means; and
- data clear means for clearing a content of the first buffer register in response to said error detection signal being consecutively generated for a predetermined number of times;
- said system further comprising bus means for interconnecting said sequence controllers and means ofr controlling said bus in a time division manner.

* * * * *